United States Patent [19]

Duvierre et al.

[11] Patent Number: 5,022,910
[45] Date of Patent: Jun. 11, 1991

[54] FEEDER TROUGH FOR TRANSFERRING MOLTEN GLASS FROM A FURNACE TO A FORMING STATION

[75] Inventors: Gérard Duvierre, Avignon; Joseph Recasens, Sorgues, both of France

[73] Assignee: Societe Europeenne des Produits Refractaires, Coubevoie, France

[21] Appl. No.: 504,000

[22] Filed: Apr. 4, 1990

[30] Foreign Application Priority Data

Apr. 6, 1989 [FR] France ............... 89 04522

[51] Int. Cl.5 .............. C03B 5/26; C03B 7/00
[52] U.S. Cl. .......................... 65/325; 65/326; 65/347
[58] Field of Search ........... 65/129, 131, 132, 134, 65/168, 324, 325, 326, 346, 347

[56] References Cited

U.S. PATENT DOCUMENTS

| | | | |
|---|---|---|---|
| 2,050,211 | 8/1936 | Honiss | 65/168 |
| 2,470,558 | 5/1949 | Honiss | 65/129 |
| 3,127,262 | 3/1964 | Allman | 65/134 |
| 3,231,357 | 1/1966 | Pither | 65/325 |
| 3,269,820 | 8/1966 | Day et al. | 65/136 |
| 3,420,653 | 1/1969 | Boettner | 65/134 |
| 4,769,059 | 9/1988 | Hidai et al. | 65/325 |

Primary Examiner—Joye L. Woodard
Attorney, Agent, or Firm—Watson, Cole, Grindle & Watson

[57] ABSTRACT

A feeder trough for transferring molten glass from a glass furnace to an object-forming station, the feeder trough comprising a channel at one of its ends to the furnace and at its other end to a bowl having at least one feeder orifice a sill which has, on its downstream face, a substantially vertical wall, occupies the entire width of the channel and has a thickness of approximately 4 to 10 cm and a height such that it allows a stream of glass approximately 8 to 10 cm thick to pass over it; and a heatable bottom drain provided upstream of the sill and practically adjoining the latter.

4 Claims, 1 Drawing Sheet

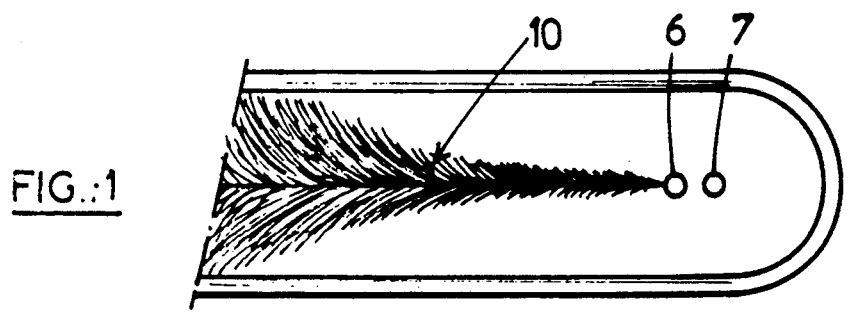
FIG.:1
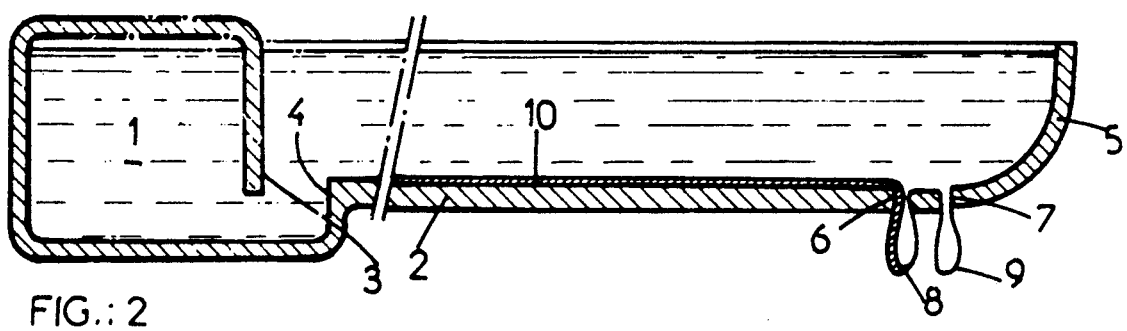
FIG.:2
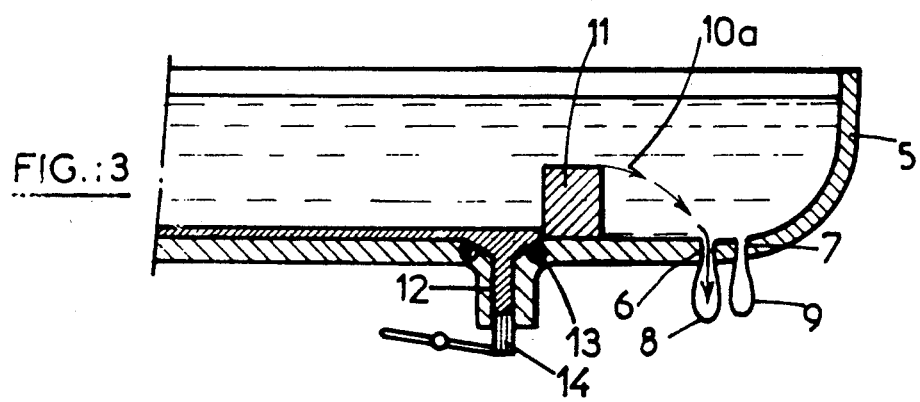
FIG.:3
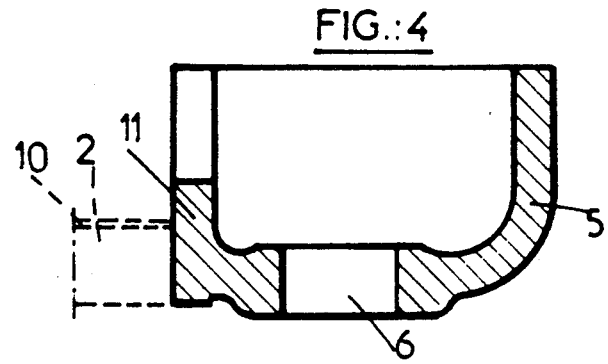
FIG.:4

FEEDER TROUGH FOR TRANSFERRING MOLTEN GLASS FROM A FURNACE TO A FORMING STATION

BACKGROUND OF THE INVENTION

1. Field of the Invention

The present invention relates to a plant for transferring molten glass from a furnace to a station for forming objects, in particular hollow glass objects.

2. The Prior Art

In the soda-lime glass industry, two types of quality can be distinguished at present: on the one hand, the quality for the small bottle and domestic glassware industry and, on the other hand, the quality for the bottle industry.

The quality requirements of the glass for the small bottle and domestic glassware industry are very high, which is why the working tanks and the transfer channels are always equipped with high-quality refractory products, normally electrocast aluminous products. These products, in contact with glass, produce only a negligible quantity of crystallized, vitreous and/or gaseous inclusions.

The quality requirements of the glass for the bottle industry are less high, and it is possible to accept minor defects of the "small cord", "scratch", "bubble" and "seed" type, which can often be made less serious by the dark colour of the glass. These defects are in most cases related to the quality of the refractories used to form the transfer channel which takes the glass from the furnace to the forming plant.

In the state of the art, use is made of alumino-silicate or mullite agglomerated refractories, the cost of which is, obviously, less than that of the electrocast aluminous products. In view of the increase in the performance and productivity levels of the furnaces, the corrosion resistance of the refractories used to date is tending to become inadequate and, moreover, it is obvious that an improvement in quality is always desirable provided it does not result in too great a rise in cost prices. For this reason, there is a tendency at present to replace the alumino-silicate or mullite agglomerated refractories by refractories of the "AZS" type, that is to say alumina-zirconia-silica refractories, which are agglomerated or electro-cast. These products have a better corrosion resistance than the refractories currently used, but, in contact with glass, a highly viscous "alumina-zirconia" phase is formed, whose diffusion and dissolution rate in glass becomes virtually zero in the downstream part of the transfer plant where temperatures below 1250° C. prevail. This phase, which is very low in volume, tends to flow, by density and convection, from the walls of the transfer channel to the bottom thereof and to move from there towards the feeder orifice or orifices.

After a certain operating time, a stream of the "alumina-zirconia" phase reaches the feeder orifices, resulting in a defect which is commonly called "cat scratches" in the finished article. These are a set of very fine parallel vitreous cords which are situated on the outer surface of the glass and have a cross-section no greater than 10 to 20 micrometres. Generally, these defects are visible only when the object is subjected to intense light.

The increase in the quality level of certain articles of the bottle industry, however, no longer permits acceptance of this "defect" and various means have been proposed, or are employed, to eliminate it. Among the means employed, "bubblers" may be mentioned, these being placed at the inlet of the transfer channel and consisting of a device which injects gas bubbles into the lower part of the glass flow, thereby generating an upward current of glass. These bubblers can be installed only at the upstream part of the channel, or in the furnace itself, since the viscosity of the glass in the downstream part would lead to the presence of bubbles in the product obtained. Other means consist of mechanical agitators, or rotating rotors, which can be situated in the downstream part of the channel, or in the feeder bowl, these agitators and rotors permitting dispersion, burbling or stretching of the alumina-zirconia stream, thus reducing the resulting defects to a size such that they are no longer problematical. The installation of these devices, which operate under difficult conditions and in a very viscous medium, is however tricky. Moreover, they are, obviously, relatively expensive.

In addition, U.S. Pat. No. 3,127,262 discloses a process and an installation for refining glass, which are characterized by the use of a sill or barrier arranged at the bottom of the glass-transfer channel, just before the bowl in which the orifice for feeding the molten glass is provided, combined with side drains provided either on the sill itself or in the side walls of the bowl, in the immediate vicinity of the sill and approximately level with the top of the sill. According to the patent mentioned, the aim of the sill is to cause the viscous lower layer of glass, which is heavy and impure, to rise and it is eliminated via the side drains. The purpose of the sill or barrier used is not therefore to retain heavy impurities, but merely to deflect the heavy and impure current of glass, which flows upwards and in the direction of the side drains. This arrangement has not however, as far as the Applicant knows, been developed in practice, no doubt owing to poor efficiency.

SUMMARY OF THE INVENTION

The object of the present invention is to provide a plant or feeder trough for transferring molten glass from a furnace to a station for forming glass objects, which makes it possible to eliminate in an efficient manner the defects of the "cat-scratch" type and which is low in cost and simple and economical to employ.

More particularly, the invention relates to a feeder trough for transferring molten glass from a furnace to an object-forming station, this feeder trough comprising a channel connected, at one of its ends, to the furnace, and at its other end, to a bowl having at least one feeder orifice directed substantially vertically from the bottom of the bowl and intended to bring a mass of molten glass or gob to the forming station, and a sill having a substantially vertical wall on its upstream face, said sill being provided on the bottom of the channel upstream of the bowl, and being used without side drains provided on the sill or in the side walls of the bowl, having a substantially vertical wall on its downstream face, occupying the entire width of the channel and having a thickness of approximately 4 to 10 cm and a height such that it allows a stream of glass approximately 8 to 10 cm thick to pass over it, and said plant additionally comprising a heatable bottom drain, said drain being provided upstream of the sill and practically adjoining the latter.

The channel may be of any known type, that is to say a horizontal, upward sloping or downward sloping channel.

Surprisingly, it has been found that the sill of the plant according to the invention retains the viscous "alumina-zirconia" phase and prevents it from contaminating the glass articles produced. Obviously, the viscous phase tends to accumulate upstream of the sill and, after a certain time, it might well pass over this sill, though this process is very slow. The sill provided in the present plant consequently permits correct functioning, between two drainage operations, for a considerable length of time.

This result is surprising considering the teachings of the abovementioned U.S. Pat. No. 3,127,262 which teaches that a sill causes a deviation of the impure stream of glass. This difference in results may be explained by various reasons.

A first reason is the absence of side drains.

A second reason is linked to the increase in the size of the transfer channel.

At the time of the filing (1960) of U.S. Pat. No. 3,127,262, the transfer channels were relatively narrow (40 to 65 cm wide) for a height of molten glass of the order of 15 to 23 cm [see Handbook of Glass Manufacture, chapter 10, page 331, by F. V. Tooley, Ogden Publishing Company, (1933)], whereas they are much wider at present, of the order of 60 to 120 cm for the same height of molten glass (15-23 cm) [see the book "Glass Making Today", page 199, by P. J. Doyle, Portcullis, (1979)]. Thus, for thermal reasons, the ratio width of the channel/height of the glass in the channel has changed from a value of the order of 3 or less to a value greater than 5, which would result in a different flow pattern.

This widening, together with the absence of side drains, probably explains the difference in results found.

According to an advantageous arrangement, it is envisaged that the sill has a substantially vertical wall on its downstream face as well. In this case, if the viscous phase retained behind the sill rises above the level of the latter and is carried downstream, it appears that there is a tendency for it to return to the bottom of the channel only gradually and, if the sill is at a sufficiently short distance from the feeder orifice or orifices, it reaches these orifices before it has returned to the bottom, aided in this by the driving effect of installations such as sleeves, rotors and plungers which are customarily provided in these orifices or in their vicinity. The heterogeneity caused by the viscous phase is then included in the mass of the finished product instead of being on the surface, and is therefore practically no longer detectable.

Furthermore, in order to be able to eliminate periodically the crawling viscous phase which accumulates upstream of the sill, the plant comprises a closable drain in the bottom channel, just upstream of the sill, which it is sufficient to heat and open from time to time to eliminate the said viscous phase. The heating of the drain during a drainage operation, the purpose of which is to melt the glass which has solidified in the drain between two drainage operations, can be carried out in a simple manner with the aid of any means currently used for this purpose. Advantageously, however, according to a preferred embodiment of the invention, the heating is carried out by means of an electric heating device. Of course, the heating elements, which come into contact with the molten glass and/or the viscous phase, must be made of a suitable refractory metal, for example platinum, capable of withstanding corrosion and high temperatures.

The drain must be positioned upstream of the sill in a position practically adjoining the latter. The term "practically adjoining" is understood to mean that the distance between the base of the sill and the nearest edge of the drain is no greater than 5 centimetres at most.

According to a preferred embodiment, the sill forms a single refractory piece with the bowl. In fact, the feeder orifice or orifices of the bowl is a part subject to quite considerable wear and must be replaced periodically. If the sill is in one piece with the bowl, it is therefore possible to take advantage of the necessary replacements of the bowl to replace at the same time the sill, the wear of which, although slower, is not however insignificant. A piece forming the bowl and provided with a sill is practically no more complicated to manufacture than a bowl of the conventional type, and its cost price is not appreciably higher. The fact of associating a barrier with the bowl enables an antiscratch system to be mounted on a transfer channel ("feeder") which was not initially provided for that, it being possible for the drain, for its part, to be formed from outside.

The present invention will now be explained in greater detail with the aid of practical examples, accompanied by the drawings:

BRIEF DESCRIPTION OF THE DRAWINGS

FIG. 1 is a highly diagrammatic plan view of a plant not provided with devices opposing to the progress of the viscous phase.

FIG. 2 is a sectional view of the same plant.

FIG. 3 is a diagrammatic sectional view of a plant similar to that of FIG. 2, but provided with means according to the invention.

FIG. 4 is a sectional view of a feeder bowl provided with a sill at its inlet, the whole forming a single piece.

DETAILED DESCRIPTION OF THE PREFERRED EMBODIMENTS

The plant described in FIGS. 1 and 2 comprises a glass-melting furnace 1, of the conventional type, not shown in FIG. 1, which is adjoined by the channel 2 (which in the case illustrated is horizontal but could be upward or downward sloping) better known by those skilled in the art as a "feeder". FIG. 2 shows a connection, between the furnace 1 and the channel 2, which comprises a baffle 3, with a sill having a vertical part 4. This sill should not be confused with that of the present invention; in fact, it is situated upstream of the conduit and consequently it would be totally incapable of arresting the products which would be formed by contact of the flow of molten glass with the refractory forming the channel.

The end of the channel 2, which is opposite the furnace 1, constitutes what is called in the art the "feeder bowl" 5. FIGS. 1, 2 and 3 show two orifices 6, 7 for the formation of gob 8, 9. These orifices 6, 7 are, in the representation illustrated, situated one behind the other in the direction of displacement of the molten glass flow, and they both emerge in the central part of the feeder bowl (the plant of the present invention could, of course, have a different number of orifices, for example one or three). At 10, the viscous phase based on alumina and zirconia is shown, this phase being formed in contact with the molten glass and the refractory of the channel, and which is to be eliminated. For the sake of clarity, the thickness and size of this phase, of which, as stated above, the volume is in fact extremely small, have been considerably increased.

As the figures clearly show, it is especially the gob 8 formed in the orifice 6 situated furthest upstream relative to the flow of the current which receives the noted viscous phase which is incorporated into its outer surface, and may therefore give rise to products exhibiting the "cat scratches" mentioned above. It is clear, however, that according to the arrangement of the orifices in the feeder bowl, either or several of the gobs may be affected by this defect.

FIG. 3 shows a channel such as that of FIGS. 1 and 2, but modified according to the invention by the addition of a sill 11 with a vertical upstream wall and a bottom drain 12 adjoining the sill and intended to drain off the excess viscous phase. In the same figure, the arrows 10a represent the path of the viscous phase downstream of the sill 11 in the event where this viscous phase passes over the sill owing to insufficient drainage or for any other reason. It can be seen that, in this case, with the sill 11 being sufficiently close to the orifice 6, the viscous phase reaches the latter before it has returned to the bottom, and is therefore embedded in the mass of the gob 8 instead of being located on its outer surface.

Associated with the bottom drain 12 is an electric heating device 13 of a type generally used for this purpose. The drain may be closed by a plug 14.

When it is desired to drain the viscous phase, the heating device 13 is put into action, then the plug 14 is released to permit the elimination of the viscous phase which has accumulated at the bottom of the channel since the preceding draining operation.

FIG. 4 shows a piece specially designed for implementing the invention which combines the feeder bowl and the sill. This single piece, which constitutes both the bowl 5 and the sill 11, is placed at the end of the channel 2. It can be easily manufactured by casting a previously melted refractory material in a mould.

When this piece becomes worn, for example as a result of the widening or deformation of the edges of the gob hole 6, it is removed and replaced.

The feeder bowl shown in FIG. 4 has only one gob-forming hole, but it is possible of course to envisage a similar bowl provided with a larger number of such holes.

We claim:

1. A feeder trough for molton glass which has a bottom and lateral side walls and which extends from a first end that connects with a glass furnace to a second end above an object-forming station, said second end being shaped as a bowl portion and said feeder trough providing a channel portion that extends from said first end to said bowl portion; at least one vertical orifice in said bottom within said bowl portion through which molten glass can flow to the object-forming station; a sill extending above said bottom in said channel portion and between said lateral side walls, said sill providing a vertical upstream wall facing said first end, a vertical downstream wall face facing said bowl portion, and having a thickness of about 4 to 10 cm; and a drainage opening in said bottom in said channel portion adjacent the upstream wall of said sill for removing viscous phase material flowing along said channel prior to reaching said sill, said channel portion being devoid of side drains.

2. A feeder trough according to claim 1, including heating means adjacent said drainage opening to assist movement of said viscous phase material through said drainage opening.

3. A feeder trough according to claim 2, wherein said sill and said bowl portion are formed as a single refractory element.

4. A feeder trough according to claim 3, wherein said single refractory element is made of a fused cast refractory material.

* * * * *